United States Patent [19]

Tsubota

[11] Patent Number: 5,479,604
[45] Date of Patent: Dec. 26, 1995

[54] IMAGE PROCESSING APPARATUS WHICH PROVIDES AN INDICATION OF WHETHER AN ODD OR AN EVEN FIELD IS DISPLAYED

[75] Inventor: Kazuo Tsubota, Hokkaido, Japan

[73] Assignee: Hudson Soft Co Ltd., Hokkaido, Japan

[21] Appl. No.: 112,334

[22] Filed: Aug. 27, 1993

[30] Foreign Application Priority Data

Oct. 14, 1992 [JP] Japan .................................. 4-300672

[51] Int. Cl.⁶ .................................................... G06F 15/00
[52] U.S. Cl. ........................... 395/162; 395/164; 395/550; 348/526; 345/113
[58] Field of Search ...................... 395/162–164, 395/550, 575, 775; 348/441, 510, 525, 526, 545, 550; 345/10, 133, 24, 113, 192

[56] References Cited

U.S. PATENT DOCUMENTS

| | | | |
|---|---|---|---|
| 4,626,839 | 12/1986 | O'Malley | 345/192 |
| 4,661,798 | 4/1987 | Ohtsu | 348/550 |
| 5,202,669 | 4/1993 | Ishimochi et al. | 348/510 |

Primary Examiner—Mark R. Powell
Assistant Examiner—Kee M. Tung
Attorney, Agent, or Firm—Lowe, Price, LeBlanc & Becker

[57] ABSTRACT

An ODD/EVEN signal, showing whether odd fields or even fields of the image are displayed on a screen, is supplied to each unit operating for data transmission. In accordance with the ODD/EVEN signal, a CPU monitors a current condition of the display image so that data transmission and processing, and use of a data bus, are controlled with exact timing. Consequently, each unit in the apparatus may operate effectively.

1 Claim, 6 Drawing Sheets

(INTERLACE MODE)

| RASTER COUNT VALUE | |
|---|---|
| EVEN FIELDS | ODD FIELDS |
| 22 | |
| | 22 |
| 23 | |
| | 23 |
| 24 | |
| | 24 |
| 25 | |
| | 25 |
| 26 | |
| | 26 |
| | 258 |
| 259 | |
| | 259 |
| 260 | |
| | 260 |
| 261 | |
| | 261 |

(INTERLACE + 1/2 DOT SHIFT)

| EVEN FIELDS | ODD FIELDS |
|---|---|
| 22 | |
| | 22 |
| 23 | |
| | 23 |
| 24 | |
| | 24 |
| 25 | |
| | 25 |
| 26 | |
| | 26 |
| | 258 |
| 259 | |
| | 259 |
| 260 | |
| | 260 |
| 261 | |
| | 261 |

FIG. 6
(ADDRESS REGISTER)

| MSB | | | | | | | | | | | | | | | LSB |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |
| * | * | * | * | * | * | * | * | * | * | * | A R | | | | |

FIG. 7
(STATUS REGISTER)

| MSB | | | | | | | | | | | | | | | LSB |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |
| DISP | O/E | RASTER COUNT | | | | | | | | | A R | | | | |

FIG. 8
(CONTROL REGISTER)

| MSB | | | | | | | | | | | | | | | LSB |
|---|---|---|---|---|---|---|---|---|---|---|---|---|---|---|---|
| 15 | 14 | 13 | 12 | 11 | 10 | 9 | 8 | 7 | 6 | 5 | 4 | 3 | 2 | 1 | 0 |
| * | RAIN | BMG3 | BMG2 | BMG1 | BMG0 | SP | BG | * | * | * | * | DC7 | EX | * | DCC |

FIG. 9

| DCC bit | | CONTENTS |
|---|---|---|
| bit 1 | bit 0 | |
| 0 | 0 | NON-INTERLACE 1FIELD=263LINE |
| 0 | 1 | NON-INTERLACE 1FIELD=262LINE |
| 1 | 0 | INTERLACE 1/2dot NON-SHIFT |
| 1 | 1 | INTERLACE 1/2dot SHIFT | ns
IMAGE PROCESSING APPARATUS WHICH PROVIDES AN INDICATION OF WHETHER AN ODD OR AN EVEN FIELD IS DISPLAYED

BACKGROUND OF THE INVENTION

The present invention is related to an image processing apparatus, and more particularly to a game computer which displays image data by an interlace displaying system.

In a conventional image processing apparatus, two kinds of displaying systems, that is, an interlace system and a non-interlace system, are used to display image data. Generally, the interlace displaying system is used for TVs of an NTSC (National Television System Committee) System, and the non-interlace displaying system is used for computer image processors.

According to the interlace displaying system, 525 scanning lines are divided into odd fields and even fields, and the two kinds of fields are scanned alternately so that the image is displayed clearly by an "after-image" phenomenon. For that reason, the interlace displaying system is suited for the TV image generally which includes a natural picture, moving at long intervals.

According to the non-interlace displaying system for RGB data, 263 scanning lines of the even fields or 262 scanning lines of the odd fields are selectively used. Image data are supplied to a VRAM (Video RAM) during a horizontal fly-back time, and then the image data are transmitted through a video encoder to a display device in accordance with a predetermined synchronizing signal.

The computer image processor treats both still and moving pictures. In such a processor, if the moving picture acting at shorter intervals is displayed by the interlace system, the displayed image has many notches at the edge thereof. Further, the interlace system needs information approximately twice that of the non-interlace system to display the same image. The image data must be transmitted and processed with exact timing to display the image in the interlace display mode.

Process periods of a variety of image data are different from each other depending on the data form and amount, so that output timings of the image data necessarily are different from each other as well. Therefore, the transmission periods of the image data must be adjusted precisely when a variety of image are superimposed, that is, the CPU must control each peripheral devices with exact timing. According to the conventional computer, however, it is difficult to control the peripheral devices with exact timing because the image data are transmitted in synchronization with vertical synchronizing signals.

SUMMARY OF THE INVENTION

It is an object of the present invention to provide a high performance computer in which peripheral units are controlled with exact timing by a CPU.

According to the invention, in an image processing apparatus, dot clock and horizontal synchronizing signals are counted. The apparatus detects whether odd or even fields of the image being displayed, whether it is a display period or fly-back period, and a value (number) of raster being displayed, in accordance with the counted values. The detected information is stored in registers, and a CPU controls internal devices at timings given in accordance with the data stored in the registers.

That is, an ODD/EVEN signal showing whether odd fields or even fields of the image being displayed is supplied to each peripheral unit operating for data transmission. In response to the ODD/EVEN signal, a horizontal and vertical synchronizing composite pulse for either odd or even field scanning operation is developed. The composite pulse is superimposed on a Y signal to obtain a video signal to perform the interlace display.

In the interlace display mode, picture elements are shifted on a screen by ½ dot for each alternate scanning line whereby output non-uniformity and roughness at an edge of the image are reduced. The CPU monitors the current condition of the displayed image so that data transmission and processing, and use of a data bus may be controlled with exact timing. Consequently, each unit in the apparatus may operate effectively, and as a result, the apparatus may process a variety types of image data at high speed.

BRIEF DESCRIPTION OF THE DRAWINGS

FIG. 6 is a diagram showing an arrangement of an address register used in the preferred embodiment.

FIG. 7 is a diagram showing an arrangement of a status register used in the preferred embodiment.

FIG. 8 is a diagram showing an-arrangement of a control register used in the preferred embodiment.

FIG. 9 is a table showing contents of the control register shown in FIG. 8.

DETAILED DESCRIPTION OF THE INVENTION

Hereinafter, a computer apparatus of a preferred embodiment according to the present invention will be explained in conjunction with appended drawings.

Figure 1:
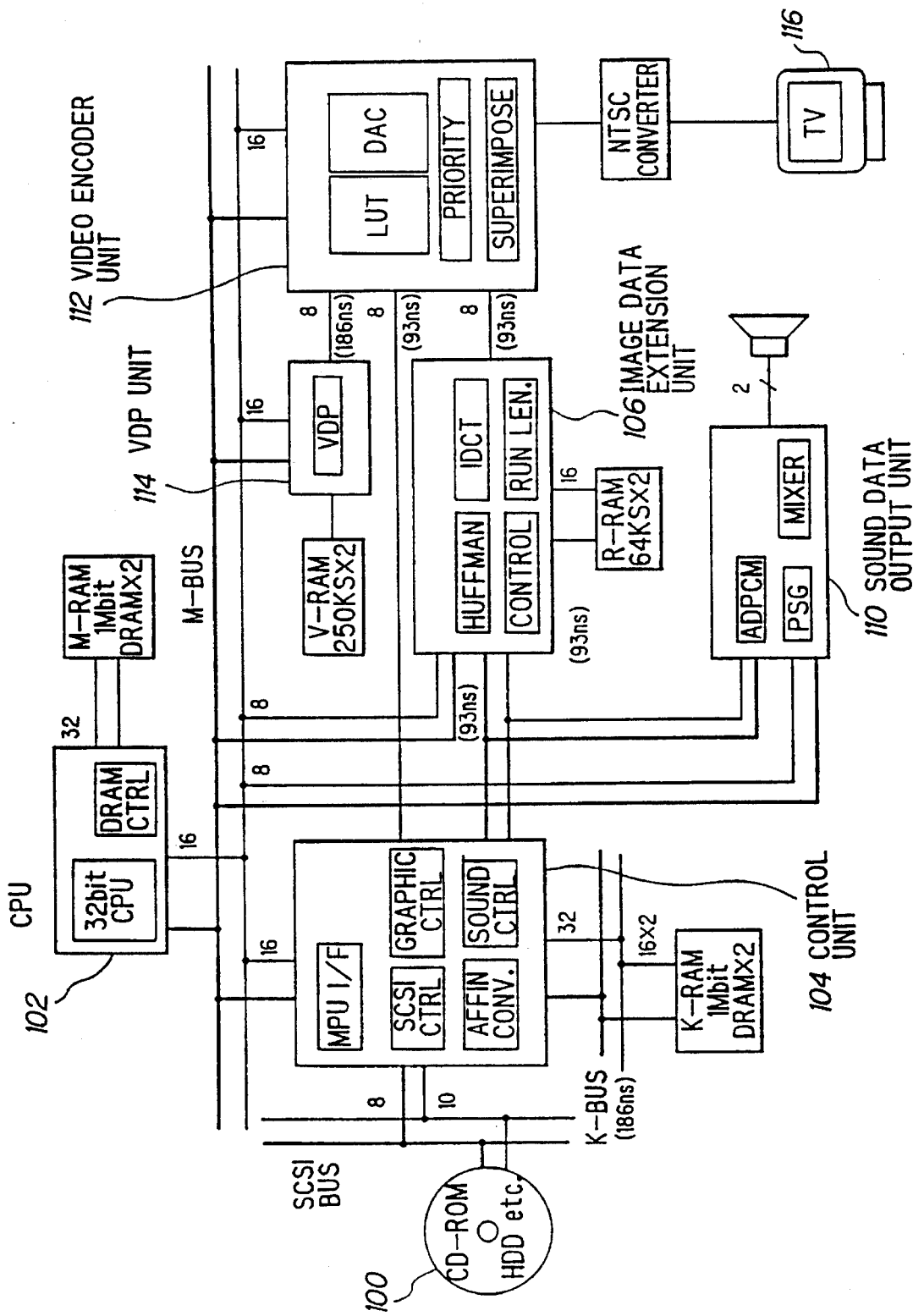
FIG. 1 is a block diagram illustrating a computer system of preferred embodiment according to the invention.

FIG. 1 shows an information processing system of the preferred embodiment. The information processing system includes a recording medium 100 such as a CD-ROM for game-software, a CPU 102 of the 32-bit type, a control unit 104 for mainly controlling transmission of image and sound data and interfacing most devices to each other, an image data extension unit 106, an image data output unit, a sound data output unit 110, a video encoder unit 112, a VDP unit 114 and a TV display monitor 116.

CPU 102, control unit 104, image data extension unit 106 and VDP unit 114 are provided with their own memories K-RAM, M-RAM, R-RAM and V-RAM, respectively.

CPU 102 directly controls a DRAM via a memory support, and performs communication through an I/O port to peripheral devices (not shown), that is, it performs an I/O control function. CPU 102 includes a timer, a parallel I/O port and an interruption control system.

VDP unit 114 reads display data which have been written in the VRAM by CPU 102. The display data are transmitted to the video encoder unit whereby the data are displayed on the TV display monitor 116.

Control unit 104 includes an SCSI controller to which image data and sound data are supplied through an SCSI interface from CD-ROM 100. Data supplied to the SCSI controller is buffered in the K-RAM. Control unit 104 also includes a DRAM controller for reading data which have been buffered in the K-RAM at a predetermined timing. In control unit 104, priority judgement is carried out dot-by-dot for image data of a natural background, and its output signal is supplied to video encoder unit 112.

Control unit 104 transmits moving image data (full color, pallet), which has been reduced in size, to image data extension unit 106 whereby the scale-down data are extended. The extended data are transmitted from image data extension unit 106 to video encoder unit 112.

Video encoder unit 112 superimposes VDP image data, the natural background image data and moving image data transmitted from VDP unit 114, control unit 104 and image data extension unit 106, respectively. Video encoder unit 112 performs color pallet reproducing, special effect processing, D/A converting and the like. Output data of video encoder unit 112 are encoded to an NTSC signal by an external circuit (not shown).

ADPCM sound data recorded in CD-ROM 100 are buffered in the K-RAM and then transmitted to sound data output unit 110 by control unit 104. The sound data are reproduced by sound data output unit 110.

In this preferred embodiment, the original output signal of a 43 MHz oscillator is used as a system clock OSC of 43 MHz. The system clock OSC is divided at the frequency dividing ratio 2 by a clock control circuit in the image data extension unit to generate a system clock SCK of 21 MHz.

When a 12 times frequency of color chrominance subcarrier is supplied to a synchronizing signal generating circuit 200 of the video encoder unit, dot clock signals of the frequency dividing ratios 8 and 6 are generated thereby.

When the system clock OSC of 43 MHz is supplied to the synchronizing signal generating circuit, the system clock is divided at the frequency dividing ratio 8 to generate a dot clock DCKKR whereby a screen mode having 256 dots for each raster is realized. Further, the system clock OSC of 43 MHz is divided at the frequency dividing ratio 6 to generate a dot clock DCK70 whereby a screen mode having 320 dots for each raster is realized.

The synchronizing signal generating circuit also supplies horizontal synchronizing signal −HSYNCA, −HSYNCB and −HSYNCC, and a vertical synchronizing signal −VSYNC. The synchronizing signal generating circuit is supplied with external horizontal and vertical synchronizing signals whereby an image may be displayed in synchronization with an external image.

In the video encoder unit, the dot clock DCK and horizontal synchronizing signal −HSYNCA are counted whereby internal signals indicating whether the image is displayed in the odd fields or even fields, and whether the image is displayed in the display period or fly-back period in the horizontal and vertical periods, are developed. These data are set in a status register of the video encoder together with a raster count value (raster number) in the horizontal display period so that the CPU may monitor the current condition of the displayed image.

In this preferred embodiment, the VDP unit treats two images of sprite (SP) and background (BG), the control unit treats four images BMG0, BMG1, BMG2 and BMG3, and the image data extension unit treats an IDCT (Huffman encode data)/RL (run-length) image, respectively.

Sound data output unit 110 treats 6 channel PSG waveform data and 2 channel ADPCM waveform data.

CPU 102 is implemented for writing data which define the BG and SP data of the VDP, writing the PSG data, and writing data into a color pallet RAM. The CPU controls the control unit to transforman image and transmit DMA data. The CPU also controls an image synthesizing process such as a chromakey process and cellophane process, and an image superimposing process based on a predetermined priority.

Figure 2:
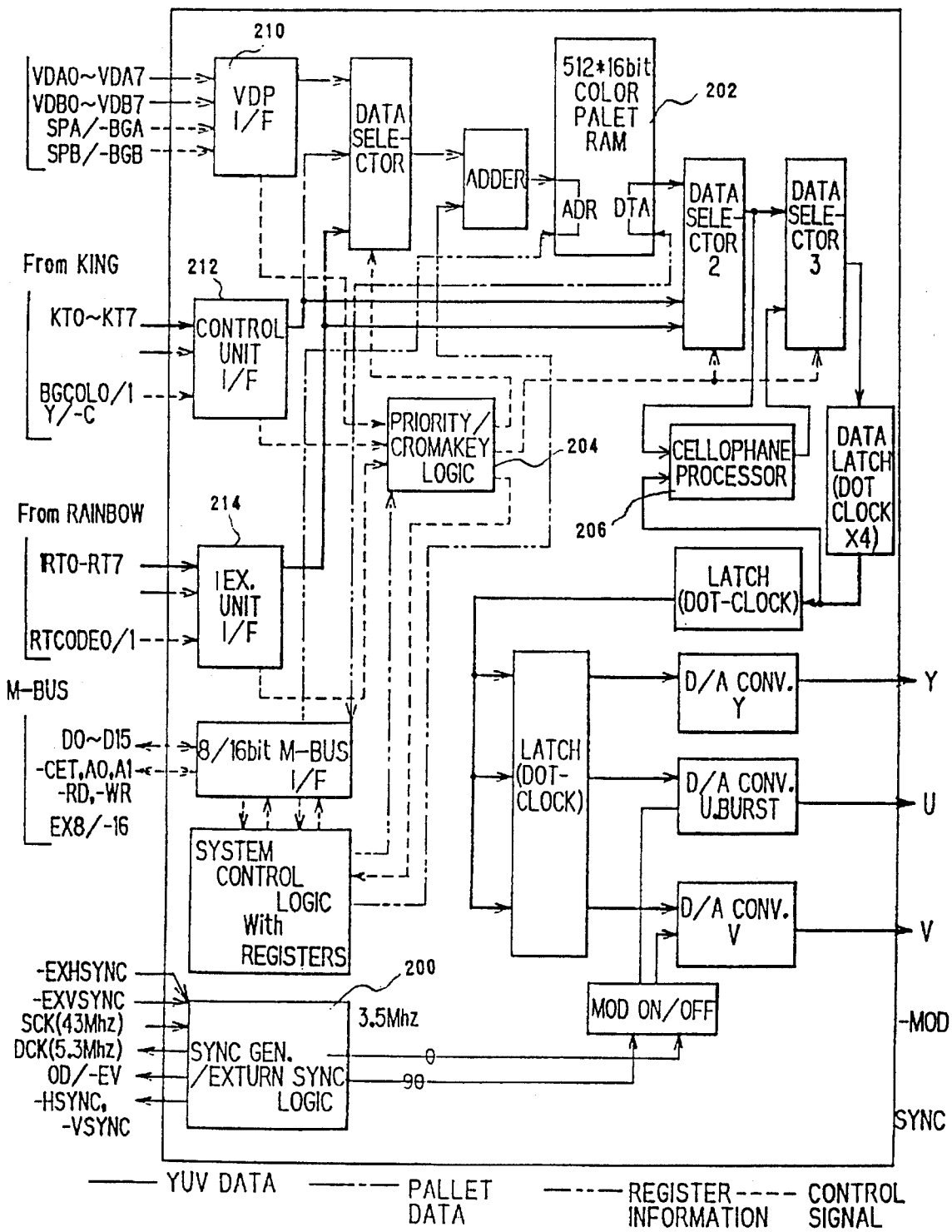
FIG. 2 is a block diagram illustrating a video encoder unit used in the preferred embodiment shown in FIG. 1.

FIG. 2 shows the video encoder unit. The video encoder unit is composed of an IC including the synchronizing signal generating circuit (200), the color pallet RAM (202), a priority arithmetic circuit 204, a cellophane arithmetic circuit 206 (for synthesizing upper and lower pictures), a D/A converter for an image signal, an 8/16 bit data bus (M-bus) interface 208, a VDP interface 210, a control unit interface 212 and an image data extension unit interface 214.

Figure 3:
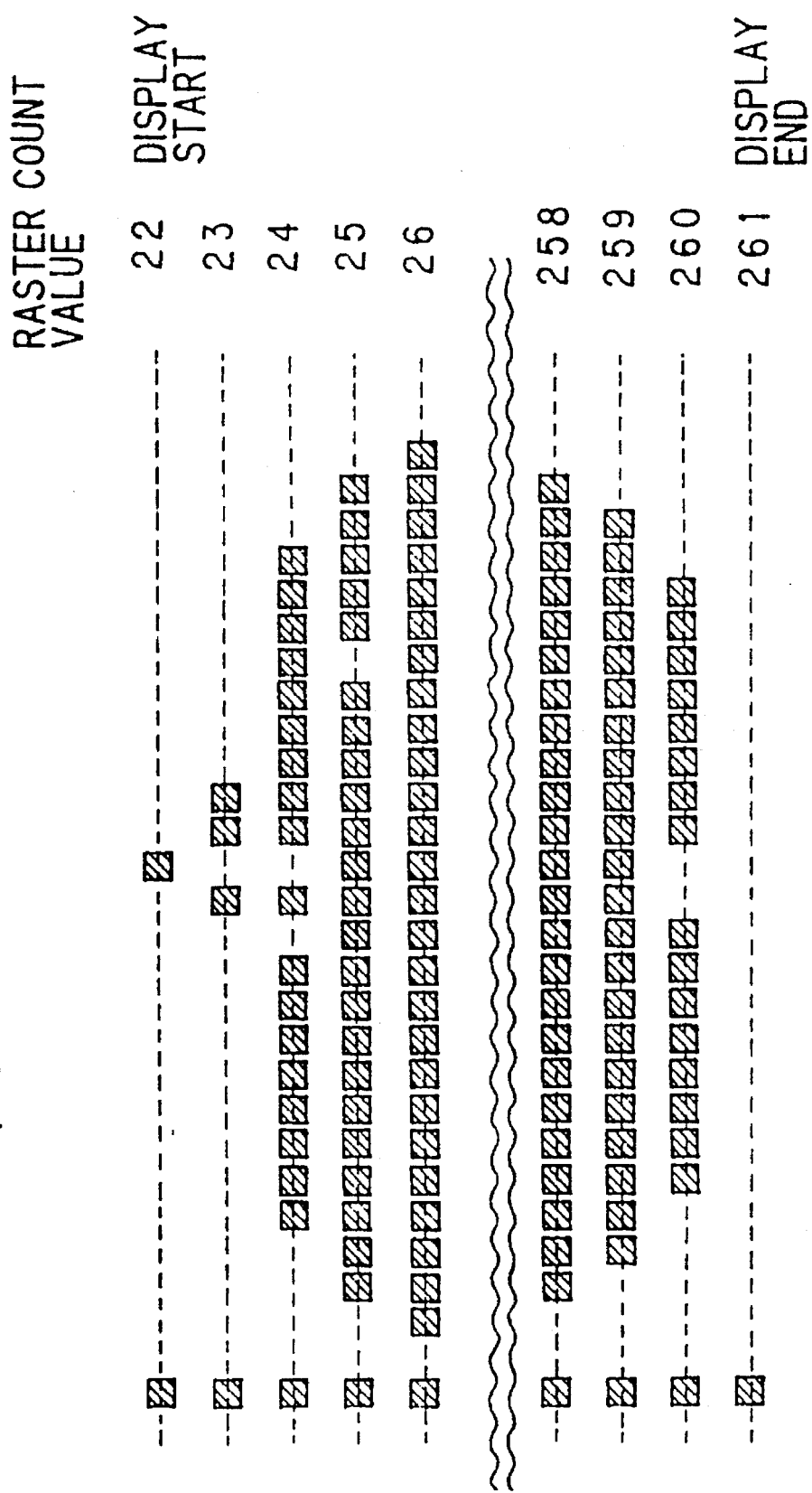
FIG. 3 is a diagram showing displayed dot data in a non-interlace mode of the preferred embodiment.
Figure 4:
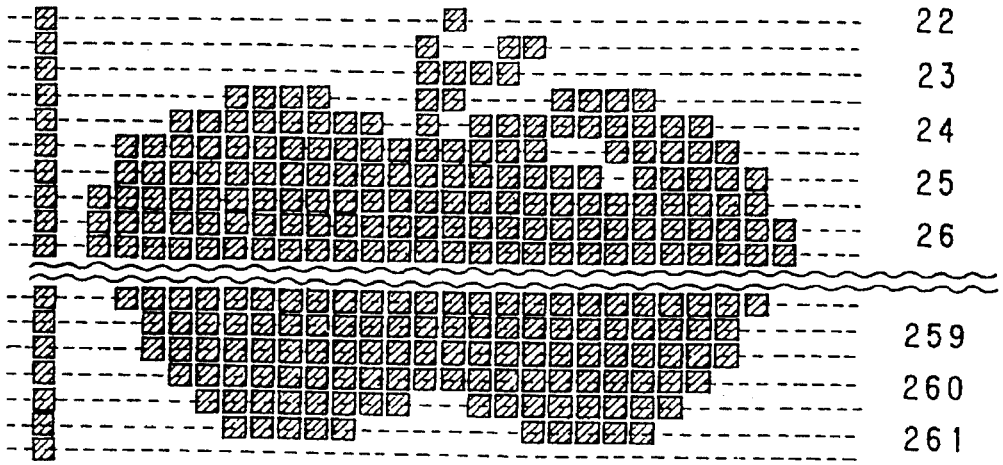
FIG. 4 is a diagram showing displayed dot data n an interlace mode of the preferred embodiment.
Figure 5:
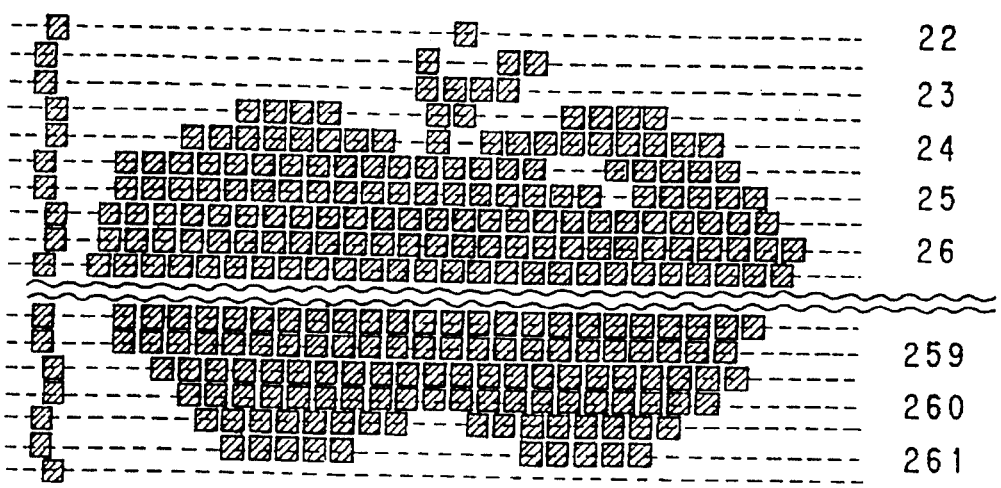
FIG. 5 is a diagram showing displayed dot data in the interlace +½ dot shift mode of the preferred embodiments.

FIGS. 3 to 5 show images displayed in an non-interlace mode, general interlace mode, and in the interlace mode with a ½ dot shift function, which will be explained later.

The video encoder unit selects one display mode from the interlace and non-interlace modes. In the interlace mode, scanning lines are fixed in number at 263 or 262, an O/E bit at the status register is set at "1" in an odd field period in a first 1/60 second period so that an image is displayed as in the non-interlace mode. In the next 1/60 second period, that is, in an even field period, the O/E bit becomes "0" to display an image located ½ line above the previous image. As a result, the distance between the first (odd) and second (even) fields becomes narrow, and the image is displayed smoothly. These processes are repeated alternately.

If the same pictures are shown on the odd and even fields, the image is displayed as if it seems being vibrated up and down at a short interval.

In the interlace mode, the image is displayed field-by-field at the exact positions on the display screen whereby a desired image is displayed clearly. Further, it is possible to display a higher quality image by using the ½ dot shift function therewith. According to the ½ dot shift function, picture elements are shifted ½ dot in a horizontal direction at one line interval. In this function, a mask is used for smoothing notched edge lines of the image, and as a result, the displayed image is composed of 255.5 dots.

In the D/A converter of the video encoder, a YUV signal of 8 bits is converted into an analog signal. If a UV signal has only 4 bit data such as the pallet data, the 4 bit data are provided at the last figure with "0000" to make it 8 bit data. The Y data are converted into an analog signal in linear fashion, for example, "00h" data are converted into a black color signal and "FFh" data are converted into a white color signal. The U and V data are also converted into analog signals in linear fashion; however, over "80h" data are expressed as positive data and under "80h" data are expressed as negative data, because the U and V data are color difference data having polarities.

A color to be expressed has the depth defined in series with difference value from "80h"data, so that colors of "00h" and "FFh" are the deepest, and no color is expressed when each of the U and V is "80h". Color hue is defined by the ratio between the difference values of the U and V signals from "80h" and the polarities thereof.

In the D/A converting process, it may be selected whether the Y signal is treated with a synchronizing signal, and whether the U and V signals are modulated by chrominance subcarrier. If chrominance subcarrier modulation is selected, color burst is superimposed on the U signal at a predetermined timing and amplitude. The D/A converter is of a current adding type, that is, a voltage conversion is carried out in accordance with the input impedance of external circuits.

An analog arithmetic is performed for the Y signal with no synchronizing signal and the non-modulated UV signal by a predetermined external circuit, to generate an RGB signal. The Y signal with synchronizing signal and the modulated UV signal are mixed by an external circuit to generate a composite video signal for the CRT display monitor.

FIGS. 6 to 8 show arrangements of an address register, the status register and a control register in the video encoder unit. The status register and control register are accessed indirectly through the address register.

The address register (AR) specifies internal registers R00 to R15 in the video encoder unit. The status register stores the current information of the displayed image.

In the status register;

(a) An "AR" at the 0th to 4th bits indicates the current value of the address register.

(b) A "RASTERCOUNT" at the 5th to 13rd bits indicates a raster number of the current display in the display period of 22 to 261. The raster number set at the "RASTERCOUNT" does not correspond to a scanning line number defined by the NTSC signal. The raster number becomes "1FFh" when an external synchronizing signal is disturbed.

(c) An "O/E" at the 14th bit indicates whether an image is displayed at odd fields (1) or even fields (0) in the interlace mode.

(d) A "DISP" at the 15th bit indicates whether the video encoder is working in a display period (H blank, V blank). "0" and "1" are set at the bit in the display period and non-display period, respectively.

In the control register (CR: R00), the 8th to 14th bits and the others are available from the following horizontal and vertical periods, respectively.

(a) A "DCC" at the 0th and first bits specifies whether the current mode is the interlace or non-interlace, as shown in FIG. 9.

(b) An "EX" at the second bit specifies whether an external synchronization is carried out. When "1" is set at the second bit, free-operation is performed until an external synchronizing signal of proper frequency is detected, and then the free-operation is locked. On the other hand, when "0" is set at the second bit, the external synchronizing operation is generally reset. However, in some cases the external synchronizing operation may be reset if the external synchronizing signal is greatly disturbed.

(c) A "DCT7" at the third bit specifies that an image is displayed by 320 dots in the horizontal direction. When "1" is set at the third bit, the 320 dot horizontal display is specified. In this mode, the dot clock of the VDP unit only attains 7 MHz frequency, so that the cellophane function becomes disabled.

(d) A "Blanking bits" at the 8th to 14th bits specify whether the pictures BG, SP, BM0, BM1, BM2, BM3 and RAIN are displayed, respectively. The instruction is available from the following horizontal period. If all the "blanking" bits are set at "0", that is, are reset, a black color is supplied as a YUV output (Y=00h, U=80h and V=80h).

Next, the operation of the address and status register is now explained.

Step 1: –CET (chip enable) and A1 terminals are set at "L" whereby the address register (AR) is accessed. Then, a register number of a register to be accessed next is written in the address register.

Step 2: Then, the A1 terminal is changed to "H" while the –CET terminal keeps "L" whereby the register written in the address register is selected. Then, predetermined data are written into or read from the selected register.

In these steps, the content of the address register is maintained at the current value until the address register is rewritten. Therefore, the first step may be omitted when the same register is again accessed.

When the address register is read, the register is changed to the status register. The status register stores current information such as whether it currently is a display period or fly-back period, whether the displayed image is in odd fields or even fields, and the number of rasters which have been displayed in the display period.

I claim:

1. An image display system comprising:

a plurality of registers, each for storing predetermined data;

a CPU (central processing unit);

internal devices, each performing a different task;

means for counting dot clock signals and horizontal synchronizing signals;

means responsive to the counting means for detecting whether odd or even fields of the image are being displayed, whether a display period or a fly-back period is in process, and which raster number in a horizontal display period is being displayed;

means for supplying the data detected by the detecting means to at least one of said registers;

wherein the CPU monitors a current condition of a displayed image and controls the internal devices at exact timings given in accordance with the data stored in said registers; and means for selectively displaying an image in one of a plurality of display modes, said modes comprising a non-interlace mode, a general interlace mode, and an interlace mode with a ½ dot shift.

* * * * *